(12) United States Patent
Irving et al.

(10) Patent No.: US 8,358,803 B2
(45) Date of Patent: Jan. 22, 2013

(54) NAVIGATION USING FOURIER PHASE TECHNIQUE

(75) Inventors: Richard Irving, Palm Beach Gardens, FL (US); Omid S. Jahromi, Palm Beach Gardens, FL (US)

(73) Assignee: Sonavation, Inc., Palm Beach Gardens, FL (US)

( * ) Notice: Subject to any disclaimer, the term of this patent is extended or adjusted under 35 U.S.C. 154(b) by 976 days.

(21) Appl. No.: 12/115,387

(22) Filed: May 5, 2008

(65) Prior Publication Data

US 2009/0274346 A1 Nov. 5, 2009

(51) Int. Cl.
- G06K 9/00 (2006.01)
- G06K 9/62 (2006.01)
- G09G 5/00 (2006.01)
- G09G 5/08 (2006.01)
- G06F 3/033 (2006.01)
- G06F 3/041 (2006.01)

(52) U.S. Cl. ........ 382/100; 382/115; 382/116; 382/224; 345/156; 345/160; 345/173

(58) Field of Classification Search .................. 382/115, 382/224; 345/156–184
See application file for complete search history.

(56) References Cited

U.S. PATENT DOCUMENTS

| | | | |
|---|---|---|---|
| 6,289,114 B1 * | 9/2001 | Mainguet | 382/124 |
| 6,459,804 B2 | 10/2002 | Mainguet | |
| 6,891,962 B1 * | 5/2005 | Kuno et al. | 382/127 |
| 6,937,226 B2 * | 8/2005 | Sakurai et al. | 345/156 |
| 7,274,808 B2 * | 9/2007 | Baharav et al. | 382/124 |
| 7,412,083 B2 * | 8/2008 | Takahashi | 382/124 |
| 7,505,612 B2 * | 3/2009 | Ikeda | 382/124 |
| 7,760,920 B2 * | 7/2010 | Abiko | 382/124 |
| 2003/0123714 A1 | 7/2003 | O'Gorman et al. | |
| 2004/0218815 A1 * | 11/2004 | Iizuka | 382/209 |
| 2005/0129291 A1 | 6/2005 | Boshra | |
| 2006/0120621 A1 | 6/2006 | Larkin et al. | |
| 2006/0210128 A1 | 9/2006 | Chou et al. | |
| 2008/0055275 A1 * | 3/2008 | Orsley | 345/175 |
| 2009/0175539 A1 | 7/2009 | Jahromi | |

OTHER PUBLICATIONS

Parham Aarabi et al., "Robust Sound Localization Using Conditional Time-Frequency Histograms," Information Fusion 4, Department of Electrical and Computer Engineering, University of Toronto, 2003, pp. 111-122.

Parham Aarabi et al., "The Fusion of Distributed Microphone Arrays for Sound Localization," EURASIP Journal on Applied Signal Processing 2003: 4, pp. 338-347.

Michael S. Brandstein et al., "A Robust Method for Speech Signal Time-Delay Estimation in Reverberant Rooms," 1997 IEEE International Conference on Acoustics, Speech, and Signal Processing, 1997, pp. 375-378.

G. Clifford Carter et al., "The Smoothed Coherence Transform," Proceedings of the IEEE, Oct. 1973, pp. 1497-1498.

(Continued)

*Primary Examiner* — Matthew Bella
*Assistant Examiner* — Jose M Torres
(74) *Attorney, Agent, or Firm* — Kenneth J. Lukacher Law Group

(57) ABSTRACT

Provided is a method for analyzing image slices. The method includes extracting first and second sub-slices from first and second image slices, respectively, and computing a shift between the first and second image slices based on the first and second sub-slices. The first and second sub-slices overlap.

Also provided is a method for controlling a cursor on a screen. The method includes determining a shift between a first image slice and a second image slice and determining a displacement of the cursor on the screen based on the determined shift.

12 Claims, 16 Drawing Sheets

OTHER PUBLICATIONS

G. Clifford Carter, "Time Delay Estimation for Passive Sonar Signal Processing," IEEE Transactions on Acoustics, Speech, and Signal Processing, vol. ASSP-29, No. 3, Jun. 1981, pp. 463-470.

Omid S. Jahromi et al., "Theory and Design of Multirate Sensor Arrays," IEEE Transactions on Signal Processing, vol. 53, No. 5, May 2005, pp. 1739-1753.

Charles H. Knapp, et al., "The Generalized Correlation Method for Estimation of Time Delay," IEEE Transactions on Acoustics, Speech, and Signal Processing, vol. ASSP-24, No. 4, Aug. 1976, pp. 320-327.

Allan G. Piersol, "Time Delay Estimation Using Phase Data," IEEE Transactions on Acoustics, Speech, and Signal Processing, vol. ASSP-29, No. 3, Jun. 1981, pp. 471-477.

George L. Sackman et al., "The Use of Phase Difference Trace Functions for Bearing Estimation with Small Circular Arrays," IEEE Transactions on Acoustics, Speech, and Signal Processing, vol. ASSP-29, No. 3, Jun. 1981, pp. 501-507.

The International Search Report cited in International Application No. PCT/US 09/02758, dated Aug. 14, 2009, 2 pages.

The Written Opinion of the International Searching Authority cited in International Application No. PCT/US 09/02758, dated Aug. 14, 2009, 4 pages.

* cited by examiner

NAVIGATION USING FOURIER PHASE TECHNIQUE

BACKGROUND OF THE INVENTION

1. Field of the Invention

The present invention relates to image slice alignment. More specifically, the present invention relates to the determination of shift information.

2. Related Art

In the field of biometric image analysis, traditional techniques sample an image, such as a fingerprint, as the image is moved or swiped across a sensing mechanism. This sensing mechanism, which could be a fingerprint sensor, captures partial images of the finger during a single swipe. This single swipe produces sets of data at different times and within different coordinate systems. Computer vision technology can then be used to reconstruct an image on the entire fingerprint by sampling these sets of data and combining the partial images to form a complete image of the fingerprint.

The process of transforming these different sets of data into one coordinate system is known to those of skill in the art as image registration. Registration is necessary in order to be able to compare, or integrate, the data obtained from different measurements.

Conventional image registration techniques fall within two realms of classification methods: (i) area-based and (ii) feature-based. The original image is often referred to as the reference image and the image to be mapped onto the reference image is referred to as the target image. For area based image registration methods, the technique looks at the structure of the image via correlation metrics, Fourier properties, and other means of structural analysis.

Techniques used in image registration can be inefficient and slow. Since a relatively large amount of information must be processed, computing shifts between image slices of complex images can be computationally intensive.

What is needed, therefore, are methods and systems that can increase the efficiency and speed of image registration techniques.

SUMMARY OF THE INVENTION

The present invention relates to systems and methods for analyzing image slices. In an embodiment, a method of analyzing image slices includes extracting first and second sub-slices from first and second image slices, respectively, and computing a shift between the first and second image slices based on the first and second sub-slices. The first and second sub-slices overlap.

In another embodiment, a system for analyzing image slices includes an extraction module configured to extract first and second sub-slices from first and second image slices, respectively, and a shift computation module configured to compute a shift between the first and second image slices based on the first and second sub-slices of the extracted sub-slices.

In another embodiment, a method for controlling a cursor on a screen includes determining a shift between a first image slice and a second image slice and determining a displacement of the cursor on the screen based on the determined shift.

In yet another embodiment, a system for controller a cursor on a screen includes a shift determining module configured to determine a shift between a first image slice and a second image slice and a cursor movement module configured to determine a displacement of the cursor on the screen based on the determined shift.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 1:
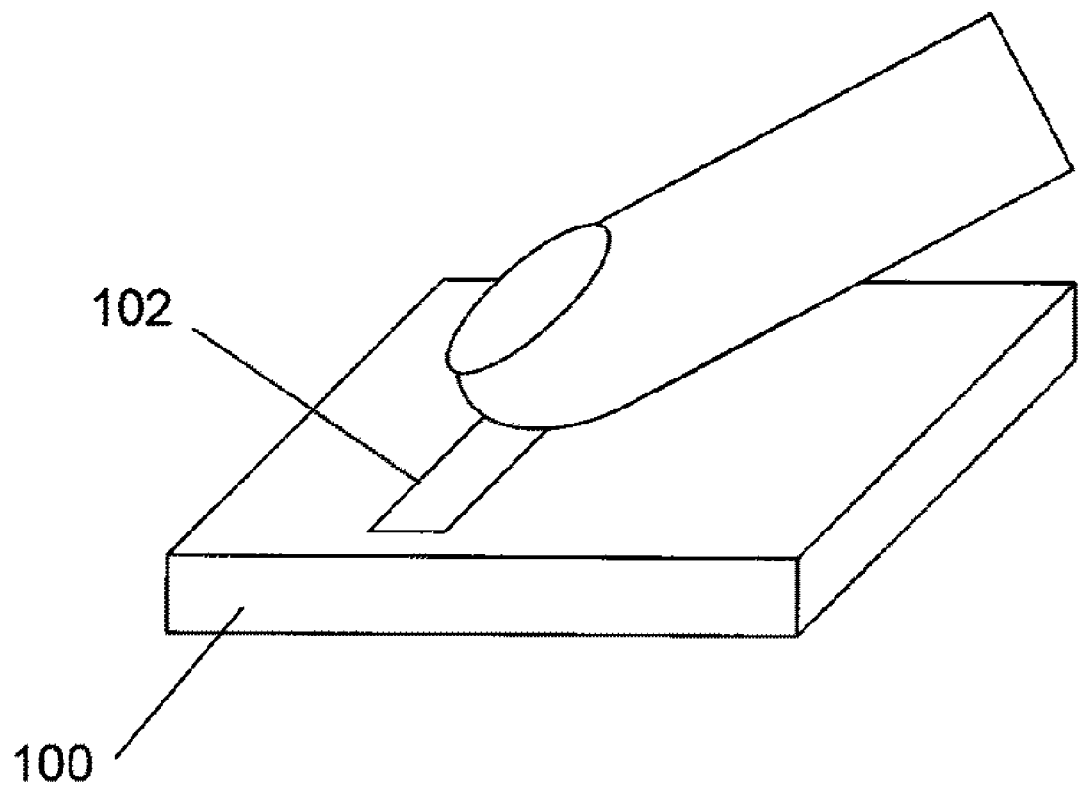
FIG. 1 is an illustration of a conventional swipe style biometric sensing device.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 is an illustration of a conventional swipe-style biometric sensing device 100 according to embodiments of the present invention. In FIG. 1, the device 100 includes a sensor 102 for obtaining biometric data (e.g. fingerprint data). In some embodiments, the sensor 102 can be an acoustic impediography or a piezoelectric device. The sensor 102 is used to capture the partial images of a biometric device, such as a finger, discussed above.

Figure 2:
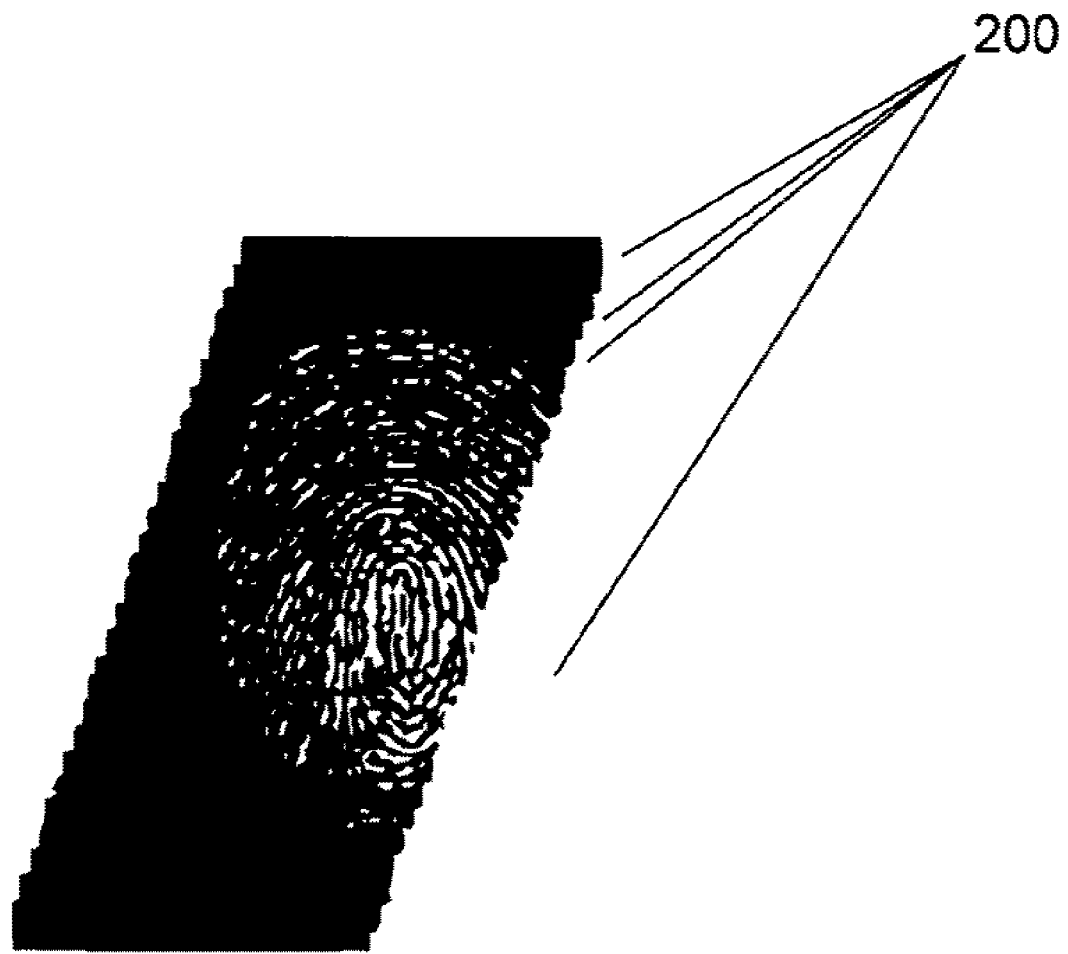
FIG. 2 is an illustration of a series of overlapping images of a fingerprint image.

FIG. 2 is an illustration of a series of overlapping partial images or image slices 200 of a fingerprint that could be generated from the swipe-style sensor 102 of FIG. 1. By determining shifts between adjacent image slices of image slices 200, image slices 200 can be aligned to form a coherent image.

Figure 3A:
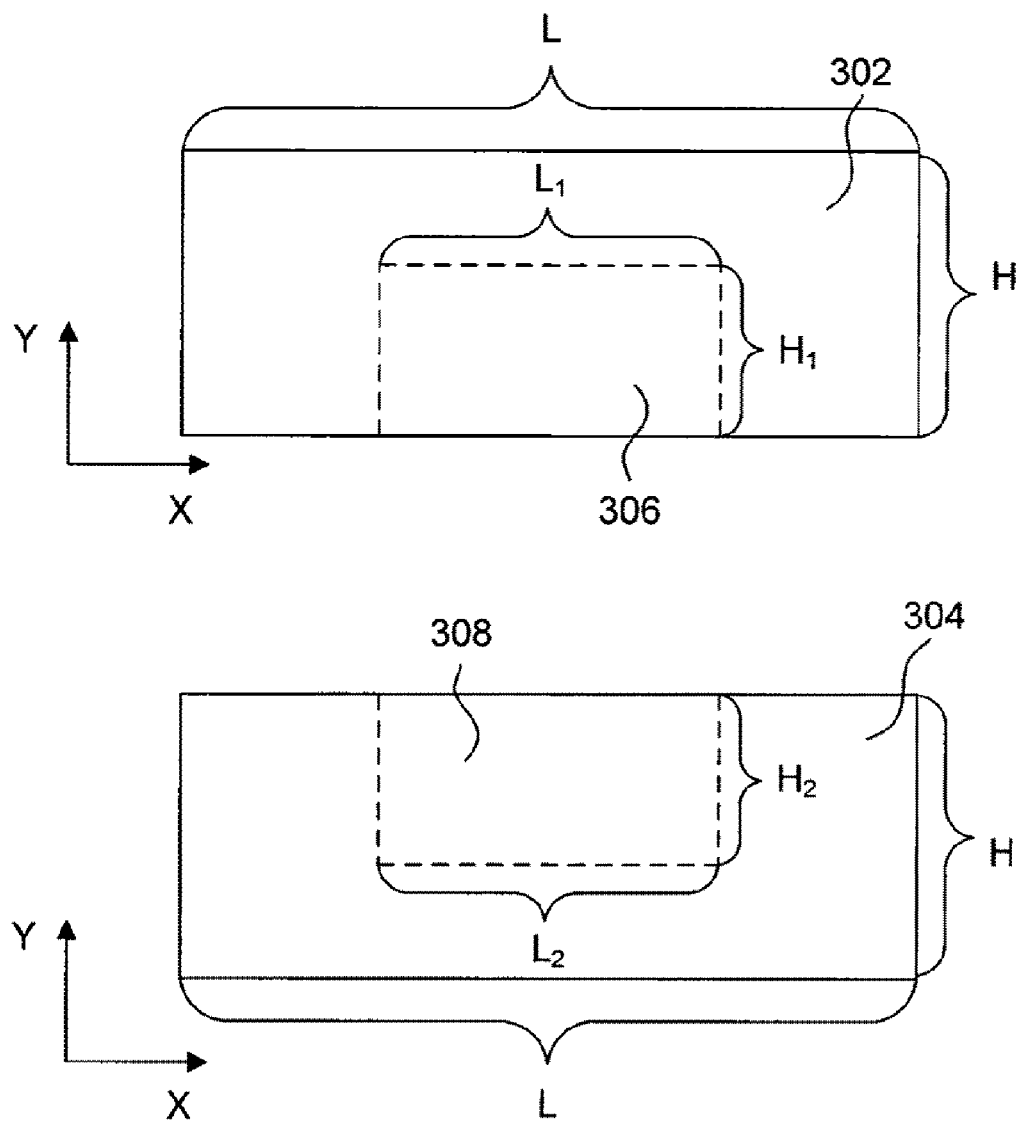
FIGS. 3A and 3B illustrate image slices, according to embodiments of the present invention.

FIG. 3A shows a first image slice 302 and a second image slice 304, according to embodiments of the present invention. In an embodiment, first slice 302 and second image slice 304 can be image slices of a scanned fingerprint. To form a coherent image of a fingerprint, first and second slices 302 and 304 have to be aligned. As would be appreciated by those skilled in the relevant art(s) based on the description herein, shifts between first and second slices 302 and 304 in the X and Y directions can be used to align first and second slices 302 and 304.

Figure 3B:
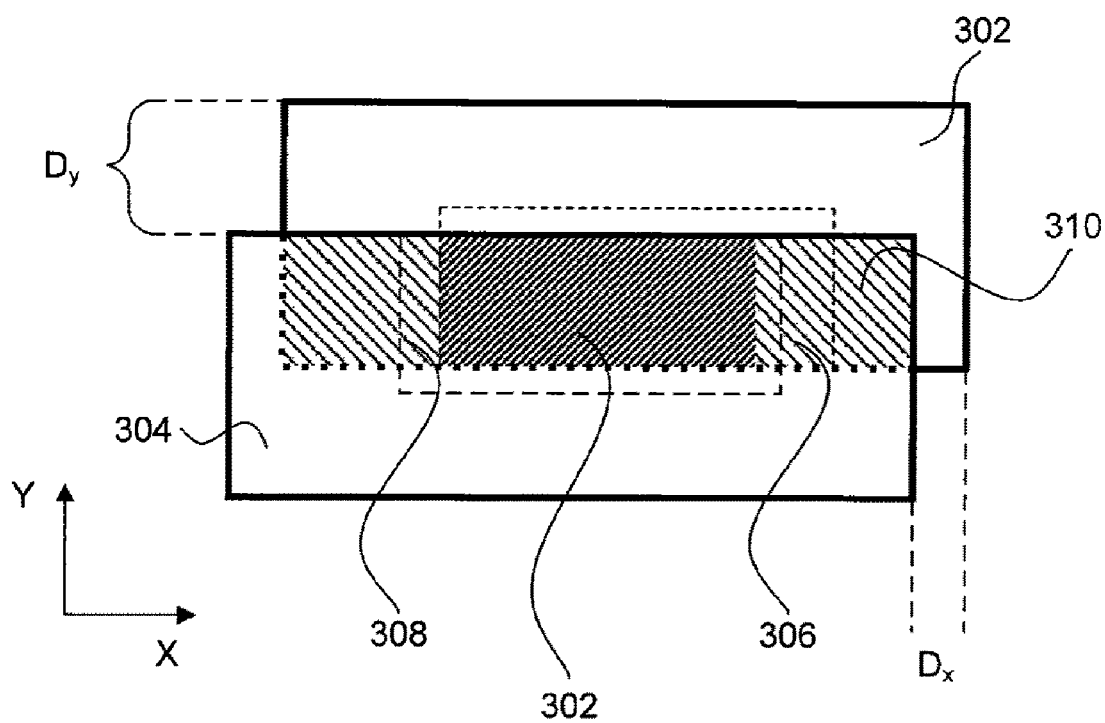

FIG. 3B illustrates first and second slices 302 and 304 when they are properly aligned, according to an embodiment of the present invention. A shift in the Y direction, shown as $D_y$ in FIG. 3B, and a shift in the X direction, shown as $D_x$ in FIG. 3B, are used to align first and second slices 302 and 304. For example, a shift between first slice 302 and second slice 304 in the X and/or Y direction can be determined by computing a PHAse Transform of first and second slices 302 and 304. For more information regarding the PHAse Transform, please refer to U.S. patent application Ser. No. 12/007,344, filed Jan. 9, 2008 to Jahromi, which is incorporated by reference herein in its entirety. Alternatively, a shift between first slice 302 and second slice 304 in the Y and/or X direction can be determined by computing a correlation between first slice 302 and second slice 304. For more information regarding determining a shift between image slices by computing a correlation, please refer to U.S. Pat. No. 6,459,804, issued Oct. 1, 2002, to Mainguet, which is incorporated by reference herein in its entirety.

As shown in FIG. 3B, first and second slices 302 and 304 overlap in an overlapping region 310. As would be appreciated by those skilled in the relevant art(s) based on the description herein, methods used to compute a shift between image slices typically use information included in a region in which the image slices overlap. For example, methods used to compute a shift between first and second slices 302 and 304 may focus primarily on the information included in overlapping region 310. In an embodiment, information outside of overlapping region 310 may not be as useful in determining a shift between image slices 302 and 304. Furthermore, such information can contribute to an erroneous shift computation and can slow down a shift computation. In embodiments described herein, however, shifts between image slices are computed based on sub-slices extracted from each of the image slices resulting in a faster and/or more accurate shift determination.

As shown in FIG. 3A, first and second slices 302 and 304 include sub-slices 306 and 308, respectively. Sub-slice 306 has dimensions $L_1$ pixels by $H_1$ pixels. Sub-slice 308 has dimensions $L_2$ pixels by $H_2$ pixels. First and second slices 302 and 304 both have dimensions L pixels by H pixels. In an embodiment, L, $L_1$, and $L_2$ can refer to the length of the image slice or sub-slice (i.e., the dimension of the slice or sub-slice in the X direction). Similarly, H, $H_1$, and $H_2$ can refer to the height of the image slice or sub-slice (i.e., the dimension of the slice or sub-slice in the Y direction). The length of sub-slices 306 and 308 can range from one pixel up the length of first and second slices 302 and 304, respectively (e.g., L pixels). Similarly, the height of sub-slices 306 and 308 can range from one pixel up to the height of first and second slices 302 and 304, respectively (e.g., H pixels). In the embodiment of FIGS. 3A and 3B, first and second slices 302 and 304 are shown to have identical lengths and heights. However, in alternative embodiments, first and second slices 302 and 304 can have different lengths and/or heights.

In an embodiment, shifts in the X and Y directions between first and second slices 302 and 304 are determined based on sub-slices 306 and 308. In such an embodiment, the shift computation methods described above, or other methods known to those skilled in the relevant art(s), are applied to sub-slices 306 and 308 instead of first and second slices 302 and 304. Thus, sub-slices 306 and 308 are effectively treated as the slices between which the shifts are computed.

As described above, the information contained in overlapping region 310 can be significant in determining shifts between first and second slices 302 and 304. The lengths, heights, and placement of sub-slices 306 and 308 with respect to first and second slices 302 and 304, respectively, are determined so that sub-slices 306 and 308 substantially overlap overlapping region 310. Thus, when sub-slices 306 and 308 are extracted from first and second slices 302 and 304, respectively, a substantial portion of overlapping region 310 is contained in an overlapping region 312 in which sub-slices 306 and 308 overlap. In such a manner, less important information to a shift computation, e.g., information outside of overlapping region 310 is ignored, while information that is useful to the determination of a shift, e.g., overlapping region 310, is used in the shift computation.

The dimensions (e.g., lengths and widths) and the placement of sub-slices 306 and 308 with respect to first and second slices 302 and 304, respectively, can influence the accuracy with which shifts between images slices 302 and 304 are determined. In an embodiment, as the portion of overlapping region 310 overlapped by sub-slices 306 and 308 increases and the portion of first and second slices 302 and 304 outside of overlapping region 310 overlapped by sub-slice 306 and/or sub-slice 308 decreases, the accuracy and speed of a shift computation according to sub-slices 306 and 308 increases.

As shown in FIG. 3B, each of sub-slices 306 and 308 substantially overlap overlapping region 310. For example, both sub-slices 306 and 308 substantially overlap overlapping region 310 in the Y direction. Sub-slices 306 and 308 also overlap a substantial portion of overlapping region 310 in the X direction. In the embodiment in which first and second slices 302 and 304 are image slices of a fingerprint scan, capturing the extent of overlapping region 310 in the Y direction may be more important than capturing the extent of overlapping region 310 in the X direction. For example, it may be known that the finger being scanned will move mostly in the Y direction relative to the scanner. Furthermore, the sensor, and thus the image slices it produces, may have a length that is substantially larger than its height. Thus, it can be determined that a shift in the X direction will be substantially smaller than the length of first and second slices 302 and 304 and that the shift in the Y direction will be comparable to the height of first and second slices 302 and 304. Therefore, only a portion of overlapping region 310 in the X direction and as much as possible of overlapping region 310 in the Y direction may be used to accurately compute shift information.

If the shifts between first and second slices 302 and 304 are known before sub-slices 306 and 308, respectively, are extracted, the dimensions of sub-slices 306 and 308 can be determined so that desired portions of overlapping region 310 are captured. For example, in the embodiment in which image slices 302 and 304 have a height of 16 pixels (e.g., H=16) and the shift in the Y direction is known to be 6 pixels, the heights of sub-slices 306 and 308 can be 10 pixels (e.g., $H_1=H_2=16-6=10$). In such a manner, both sub-slices 306 and 308 can completely overlap in region 310 in the Y direction yet contain no extra information in the Y direction, e.g., outside of overlapping region 310. More generally, the height of a sub-slice extracted from an image slice may be determined as the shift in the Y direction between the respective image slice and another image slice (e.g., an adjacent image slice with which the respective image slice will be aligned) subtracted from the height of the respective image slice.

However, as will be apparent to those skilled in the relevant art(s) based on the description herein, it is typically difficult to know a shift between first and second slices 302 and 304 before sub-slices 306 and 308 are extracted. In such an embodiment, the dimensions of sub-slices 306 and 308 may be determined based on the expected shift between image slices 302 and 304. For example, if it is determined that the expected shift in the Y direction between first and second slices 302 and 304 is 6 pixels and the height of first and second slices 302 and 304 is 16 pixels, the height of sub-slices 306 and 308 may be determined to be 10 pixels.

In an embodiment, the lengths of sub-slice 306 and 308 may be determined based on an expected shift between first and second slice 302 and 304 in the X direction in a substantially similar manner.

In another embodiment, the lengths of sub-slices 306 and 308 can be determined based on a known range of typical shifts in the X direction, so that sub-slices 306 and 308 are completely included in overlapping region 310 in the X direction. For example, it may be known that a shift in the X direction will not exceed 5 pixels. In an embodiment in which the length of image slices 302 and 304 is 120 pixels (e.g., L=120), the length of sub-slices 306 and 308 may be selected to be less than or equal to 115 pixels (120−5=115), e.g., 64 pixels. In contrast to the heights of sub-slices 306 and 308, which are determined to include as much of the height of overlapping region 310 as possible, the lengths of sub-slices 306 and 308 can be determined so that sub-slices 306 and 308 are completely included in overlapping region 310, since, as described above, the shift in the X direction between first and second slices 302 and 304 is much smaller than the length of first and second slices 302 and 304 and a finger in a fingerprint scan may move predominantly and predictably in the Y direction.

In addition to the dimensions, the locations of first and second slices 302 and 304 from which sub-slices 306 and 308, respectively, are extracted are also important in accurately and quickly computing shifts between first and second slices 302 and 304. As shown in FIG. 3A, sub-slices 306 and 308 are non-symmetric. In other words, sub-slices 306 and 308 do not occupy the same region of their respective image slices. In an embodiment, sub-slices 306 and 308 may be non-symmetric so that they can maximize their overlap with overlapping region 310. For example, it may be known before the extraction of sub-slices 306 and 308 that overlapping region 310 will include a portion of the bottom edge of first slice 302 and a portion of the top edge of second slice 304, e.g., since first slice 302 is received from a sensor before second slice 304 and the finger is known to be moving downward in the Y direction relative to sensor. Thus, sub-slice 306 can be located such that its bottom edge coincides with the bottom edge of first slice 302 and sub-slice 308 can be located such that its top edge coincides with a top edge of second slice 304.

In another embodiment, the locations in the X direction from which sub-slices 306 and 308 are extracted can be determined in a similar fashion, e.g., instead of top and bottom edges, left and right edges. However, in an alternate embodiment, the direction of the shift (e.g., the mathematical sign) may not be known in X direction before sub-slices 306 and 308 are extracted. For example, a finger may move unpredictably in the X direction during a swipe. Thus, sub-slices 306 and 308 can be extracted from a central location of first and second slices, respectively, in an attempt to ensure they at least partially overlap overlapping region 310. In an embodiment, a non-symmetric pair of sub-slices can be non-symmetric with respect to the X direction, the Y direction, or both.

Thus, as described above, the locations from which sub-slices are extracted may be non-symmetric and may be determined before the sub-slices are extracted from their respective image slice partially based on whether the respective slice will overlap with the other image slice in a bottom, top, left, right, or an unpredictable region. However, shifts between image slices are typically not known before the sub-slices are extracted. Thus, the dimensions of the sub-slices are determined based on an expected shift or a range of expected shifts between the respective image slices.

Figure 4:
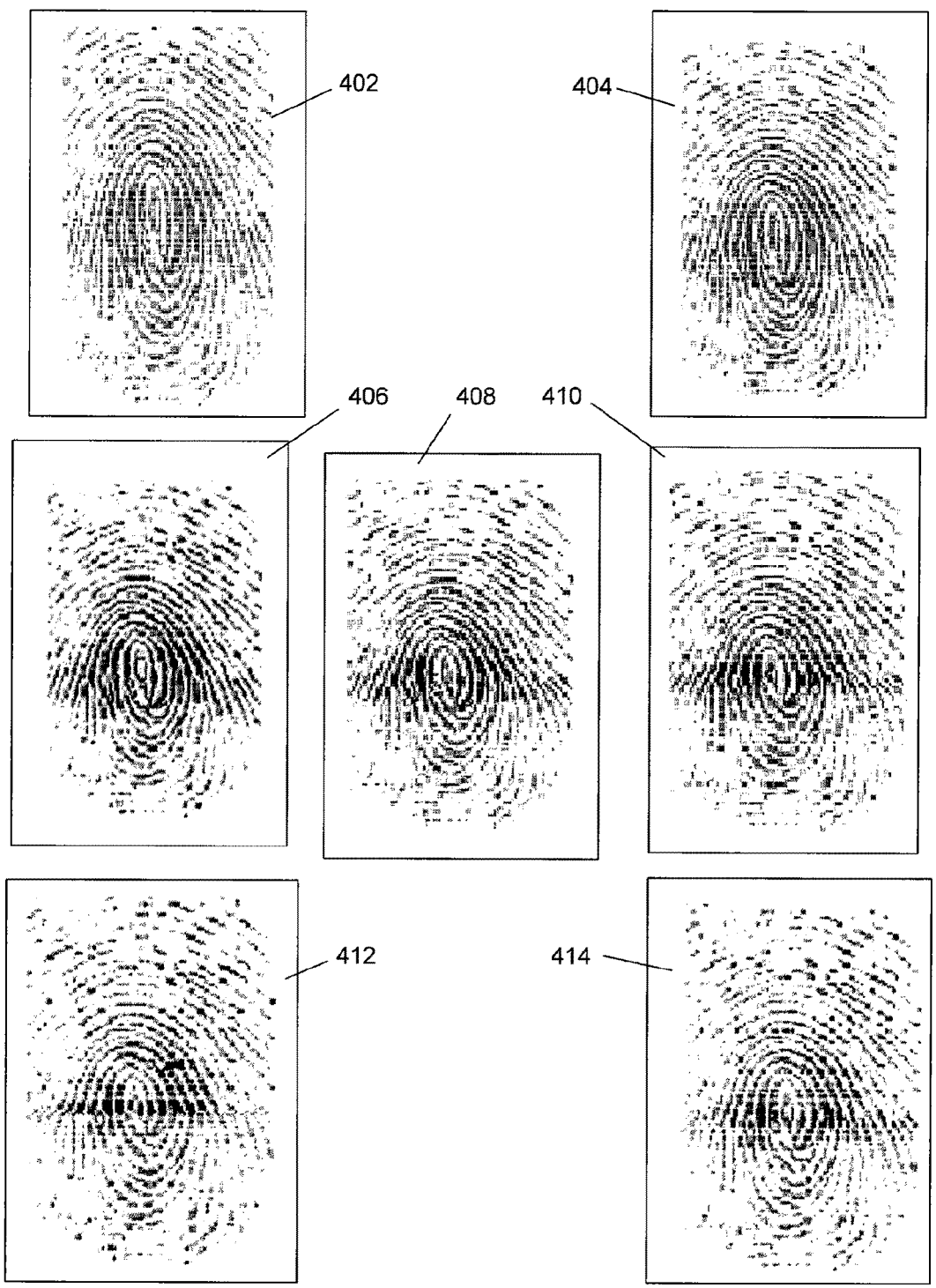
FIGS. 4-6 show fingerprint images, according to embodiments of the present invention.
Figure 5:
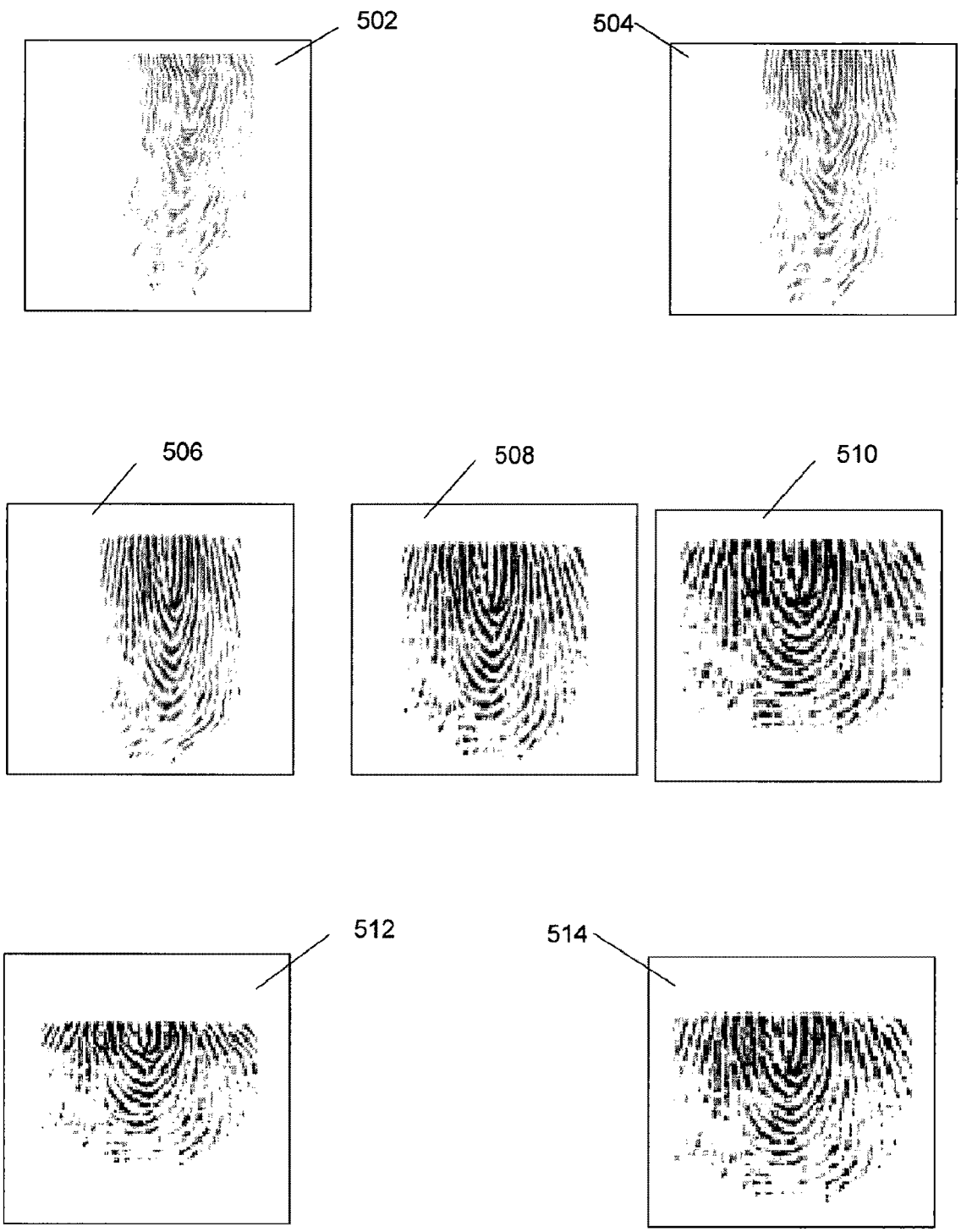
Figure 6:
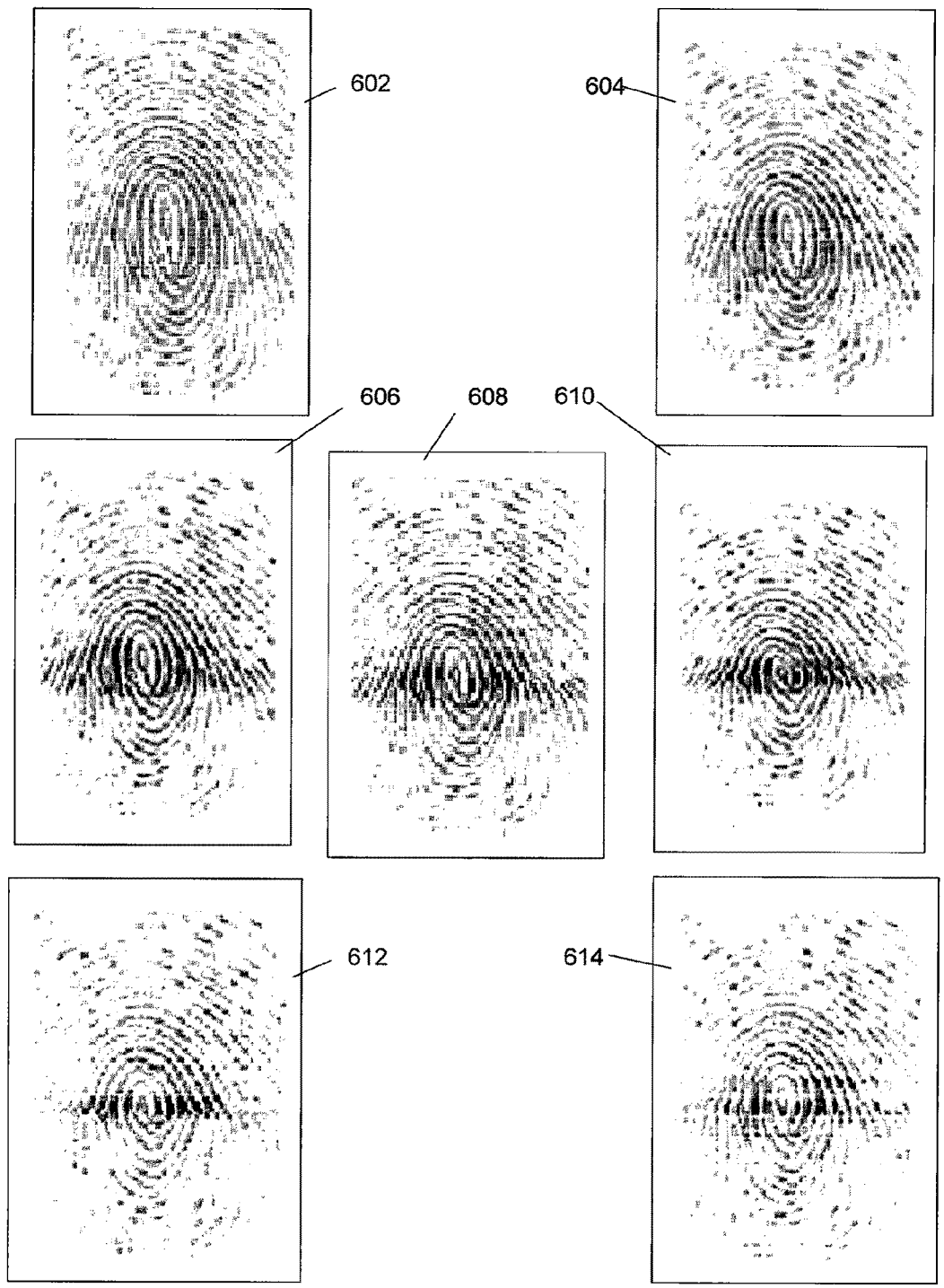

FIGS. 4-6 show fingerprint images that include image slices aligned using sub-slices of different heights, according to an embodiment of the present invention. The image slices aligned to form the fingerprint images are 8 pixels in height and 192 pixels in length. The extracted sub-slices are non-symmetric with respect to the Y direction with sub-slices either sharing an edge with a top edge of an image slice or a bottom edge of its respective image slice based on where the respective image slice is expected to overlap with the next image slice, as described above. The sub-slices are located in a central portion of the respective image slices with respect to the X direction.

FIG. 4 shows fingerprint images 402-414. Fingerprint images 402, 404, 406, 408, 410, 412, and 414 are aligned using shifts determined using sub-slices that are 2, 3, 4, 5, 6, 7, and 8 pixels in height, respectively. In FIG. 4, each of the image slices used to form images 402-414 have a shift of 5 pixels with adjacent image slices. Thus, as described above, a fingerprint image that is aligned with sub-slices that have a height of 3 pixels, e.g., 8−5=3, would produce the most accurate fingerprint image. As shown in FIG. 4, fingerprint image 404 that includes image slices aligned using sub-slices that have a height of 3 pixels is the most accurate fingerprint image out of fingerprint images 402-414.

FIG. 5 shows fingerprint images 502 through 514 that include image slices aligned using sub-slices of different height. In particular, fingerprint images 502, 504, 506, 508, 510, 512, and 514 are aligned include image slices that are aligned using shifts determined using sub-slices that have a height of 2, 3, 4, 5, 6, 7. and 8 pixels in height, respectively. Image slices used to form fingerprint images 502-514 are known to have a shift in the Y direction of 2 pixels with adjacent image slices. Image slices that are known to have a shift in the Y direction of 2 pixels should be best aligned based on shifts determined using sub-slices that have a height of 6, e.g., 8−2=6, pixels. As shown in FIG. 5, fingerprint image 510, aligned using shifts determined based on sub-slices that have a height of 6 pixels, is the most accurate fingerprint image out of fingerprint images 502-514 shown in FIG. 5.

FIG. 6 shows fingerprint images 602 through 614 aligned using shifts determined using sub-slices of different height. In particular, fingerprint images 602, 604, 606, 608, 610, 612, and 614 include image slices that are aligned shifts determined using sub-slices of height 2, 3, 4, 5, 6, 7, and 8 pixels in height. Image slices used to form fingerprint images 602-614 are known to have a shift in the Y direction of 6 pixels with adjacent image slices. Thus, a fingerprint image that includes image slices aligned using shifts determined using sub-slices that have a height of 2 pixels, e.g., 8−6=2, would be expected to produce the most accurate fingerprint image. As shown in FIG. 6, fingerprint image 602 is the most accurate fingerprint image out of the fingerprint images 602-614.

Thus, if the shift between a pair of image slices can be estimated, the dimensions of the sub-slices can be determined so that the shift between the image slices can accurately be determined. Further, as shown in FIGS. 4-6, images including image slices aligned using shifts determined using sub-slices that have heights close to the optimal heights also produce relatively accurate images. Thus, even in the case that the expected shift is not precisely correct, accurate shift information may be obtained and image slices can be accurately aligned. For example, images 402, 406, and 408 of FIG. 4, images 508, 512, and 514 of FIG. 5, and images 604 and 606 of FIG. 6 are not aligned using shifts determined using the best height for the shifts in the Y direction for each of the respective sets of image slices, but still may be generally accurate fingerprint images.

Figure 7:
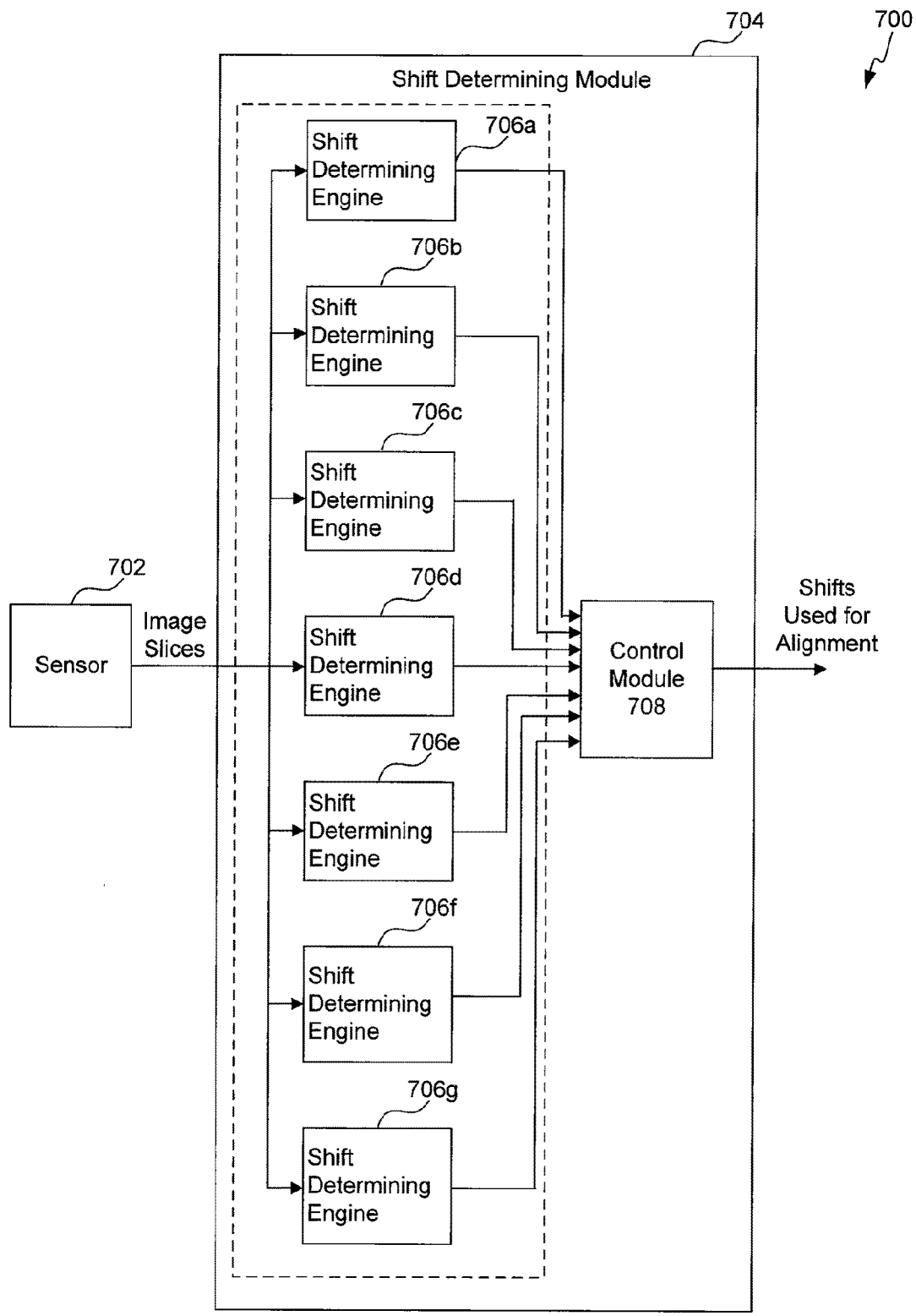
FIG. 7 is an illustration of a system for analyzing image slices, according to an embodiment of the present invention.

FIG. 7 shows a system 700 for processing image slices, according to an embodiment of the present invention. System 700 includes a sensor 702 and a shift determining module 704. Sensor 702 is configured to output image slices. For example, sensor 702 can be a swipe fingerprint scanner. In alternate embodiments, sensor 702 can be other types of sensors that produce image slices, e.g., a retinal scanner.

Figure 8:
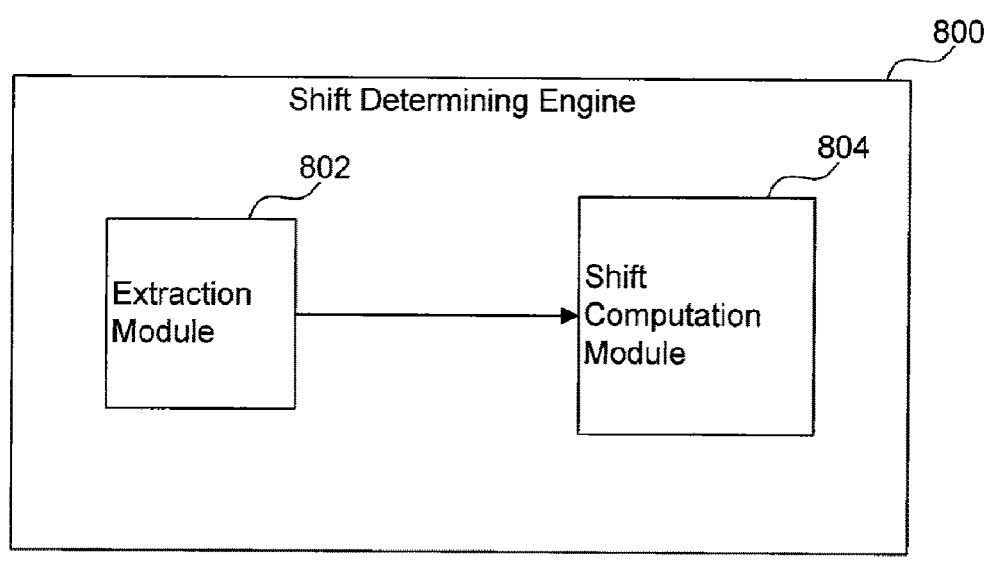
FIG. 8 is an illustration of a shift determining engine, according to an embodiment of the present invention.

Shift determining module 704 includes shift determining engines 706a-706g, collectively referred to as shift determining engines 706 and a control module 708. FIG. 8 shows a shift determining engine 800, according to an embodiment of the present invention. One or more of shift determining engines 706 can be implemented as shift determining engine 800, shown in FIG. 8. Shift determining engines 706 as well as control module 708 may be implemented as hardware, software, firmware, or any combination thereof. The operation of system 700 will be described with reference to FIG. 9, below.

Figure 9:
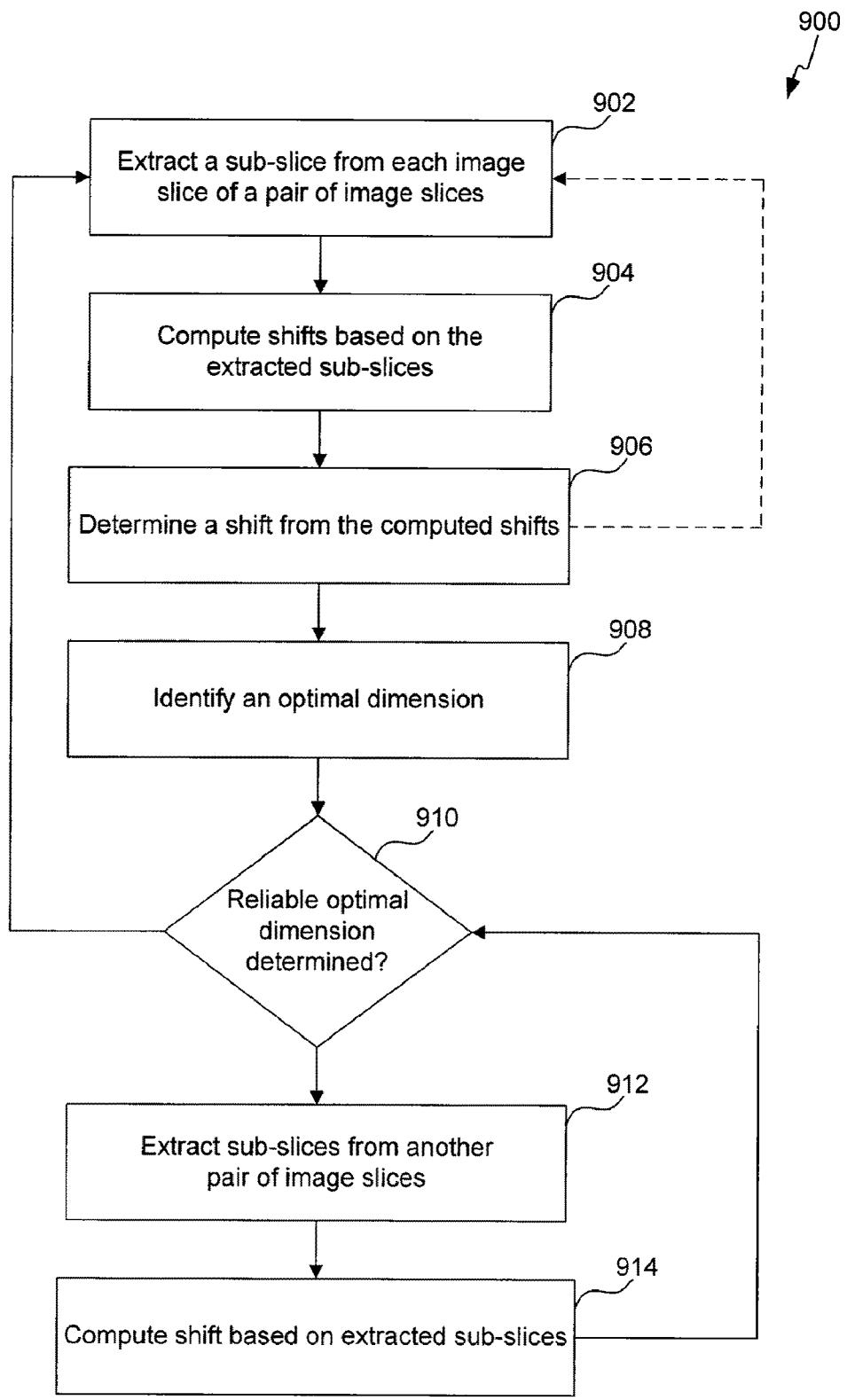
FIG. 9 is a flowchart of a method for analyzing image slices, according to embodiments of the present invention.

FIG. 9 shows a flowchart 900 of a method for analyzing image slices, according to an embodiment of the present invention. Flowchart 900 is described with reference to the embodiments of FIGS. 7 and 8. However flowchart 900 is not limited to those embodiments. The steps shown in FIG. 9 do not necessarily have to occur in the order shown. The steps of FIG. 9 are described in detail below.

Flowchart 900 begins with step 902. In step 902, a sub-slice is extracted from each image slice of a pair of image slices. For example, in FIG. 7, each engine of shift determining engines 706 receives a pair of image slices from sensor 702 and extracts a sub-slice from each image slice of the pair of received image slices. For example, as described above, shift determining engines 706 may be implemented as shift determining engine 800 shown in FIG. 8. Extraction module 802 of shift determining engine 800 may receive the pair of image slices and extract a sub-slice from each of the pair of sub-slices.

In an embodiment, each of shift determining engines 706 extracts sub-slices that have different dimensions (e.g., according to different expected shifts). For example, in the embodiment in which sensor 702 outputs image slices that have a height of 8 pixels shift determining engines 706a, 706b, 706c, 706d, 706e, 706f, and 706g can extract sub-slices with height of 2, 3, 4, 5, 6, 7, and 8 pixels, respectively, corresponding to expected shifts of 6, 5, 4, 3, 2, 1, and 0 pixels, respectively.

Furthermore, each of shift determining engines 706 can extract sub-slices with the same length. The length of the sub-slices can be determined based on a range of typical shifts in the X direction, as described above with reference to the lengths of sub-slices 306 and 308.

The sub-slices extracted by each of shift determining engines 706 may also be non-symmetric. For example, the extracted sub-slices may be non-symmetric in the Y direction and symmetric in the X direction. In particular, the sub-slices can share an edge with a top or bottom edge of a respective image slice depending on where the image slice will overlap with the other image slice of the pair of received image slices and can be located in a central portion of the respective image slice with respect to the X direction, as described above with respect to sub-slices 306 and 308.

In step 904, shifts between the pair of image slices are computed based on the extracted sub-slices. For example, shifts may be computed by computing a PHAse Transform of or a correlation between the extracted sub-slices, as described above. A shift may be computed in each of the X and Y directions.

For example, in FIG. 7, shift determining engines 706 compute a shift between the received pair image slices using extracted sub-slices. For example, in the embodiment in which shift determining engines 706 are implemented as shift determining engine 800 shown in FIG. 8, shift computation module 804 receives the extracted sub-slices from extraction module 802 and computes a shift by computing a PHAse Transform of the extracted slices. As described above, each of shift determining engines 706 can extract sub-slices with different dimensions. Thus, in step 904, shifts can be computed between the pair of image slices based on sub-slices extracted with different dimensions (e.g., different heights).

In step 906, a shift is determined based on the computed shifts. The determined shift may be used to align the pair of image slices. For example, a median or mean of a set of computed shifts may be calculated to determine the shift. In alternate embodiments, other statistical operators know to those skilled in the relevant art(s) can be used to determine a shift from the computed shifts. In a further embodiment, a shift is determined in both the X and Y directions in such a manner.

For example, in FIG. 7, control module 708 receives computed shifts from shift determining engines 706. Control module 708 computes a mean or median of the received computed shifts to determine shifts that are used to align the received pair of image slices. In the embodiment in which control module 708 computes a mean, the mean may be a decimal number. In such an embodiment, the decimal number may be rounded to an integer so that the two image slices can be aligned. In a further embodiment, control module 708 receives a first set of shifts in the X direction and a second set of shifts in the Y direction and determines shifts in the X and Y to be used to align the pair image slices in the manner described above.

In step 908, an optimal dimension is identified. For example, the optimal dimension may be an optimal height of a sub-slice. For example, in FIG. 7, control module 708 may identify an optimal height of a sub-slice. The optimal height may correspond to a shift determining engine of shift determining engines 706 that outputs the shifts determined in step 906. For example, based on the received computed shifts, control module 708 may determine shifts that match the shifts computed by shift determining engine 706a. Control module 708 may then identify shift determining engine 706a as outputting accurate computed shifts. Thus, control module 708 determines that the height of the sub-slices extracted by shift determining engine 706a, e.g., two pixels in height, is the optimal dimension.

In step 910, it is determined whether the optimal dimension is reliable. For example, it may be determined whether sub-slices having the optimum dimension can be used to accurately determine a shift between another pair of image slices. For example, in FIG. 7, control module 708 may determine whether shifts computed by shift determining engine 706a will be accurate for a subsequent pair of image slices. For example, control module 708 may make such a determination by determining whether the computed shift outputted by shift determining engine 706a has been equal to the shift determined by control module 708 for a predetermined number of pairs of slices.

If it is determined that a reliable optimal dimension has not been determined, flowchart 900 returns to step 902. Alternatively, if an optimum dimension has been determined, flowchart 900 proceeds to step 912.

In step 912, sub-slices are extracted from another pair of image slices. The extracted sub-slices have the optimal dimension. For example, in FIG. 7, control module 708 may disable shift determine engines 706b-706g if it is determined that the height of sub-slices extracted by shift determining engines 706a is a reliable optimal dimension. In such an embodiment, the shift outputted by control module 708 is identical to the shift computed by shift determining engine 706a. By disabling shift determining engines 706b-706g power may be saved and the shift computation may be made faster.

In step 914, a shift is computed based on the extracted sub-slices. In an embodiment, step 914 is substantially similar to step 904. However in step 914, the shift is computed based on extracted only sub-slices that have the optimum dimension. For example, in FIG. 7, shift determining engine 706a computes a shift between two image slices based on sub-slices that have the optimal dimension.

After step 914, flowchart 900 returns to step 910. Thus, it is determined again whether the optimum dimension is still reliable. If the optimum dimension is determined to be still reliable, shifts between image slices can still be determined based on sub-slices that have the optimum dimension. If not, a set of shifts are computed based on sub-slices that have varying dimensions and a shift is determined from the set of shifts, as described above.

As shown in FIG. 9, flowchart 900 may return to step 902 after the completion of step 906. In such an embodiment, a shift can continually be determined from a set of computed shifts, each of which is computed based on extracted sub-slices that have a different dimension (e.g., a different height). For example, in FIG. 7, each of shift determining engines 706 continually computes shifts using sub-slices of different dimensions. Alternatively, prior data can be used so that one or more of shift determining engines 706 can be turned off or otherwise disabled to save power and computing time (e.g., through the identification of an optimal dimension). In such an embodiment, control module 708 effectively determines an expected shift, e.g., a height of a sub-slice which is a function of the expected shift, as described above, and determines a shift based on sub-slices having a height corresponding to the expected shift. As long as the expected shift remains reliable, control module 708 can keep one or more of shift determining engines 706 turned off or otherwise disabled.

Figure 10:
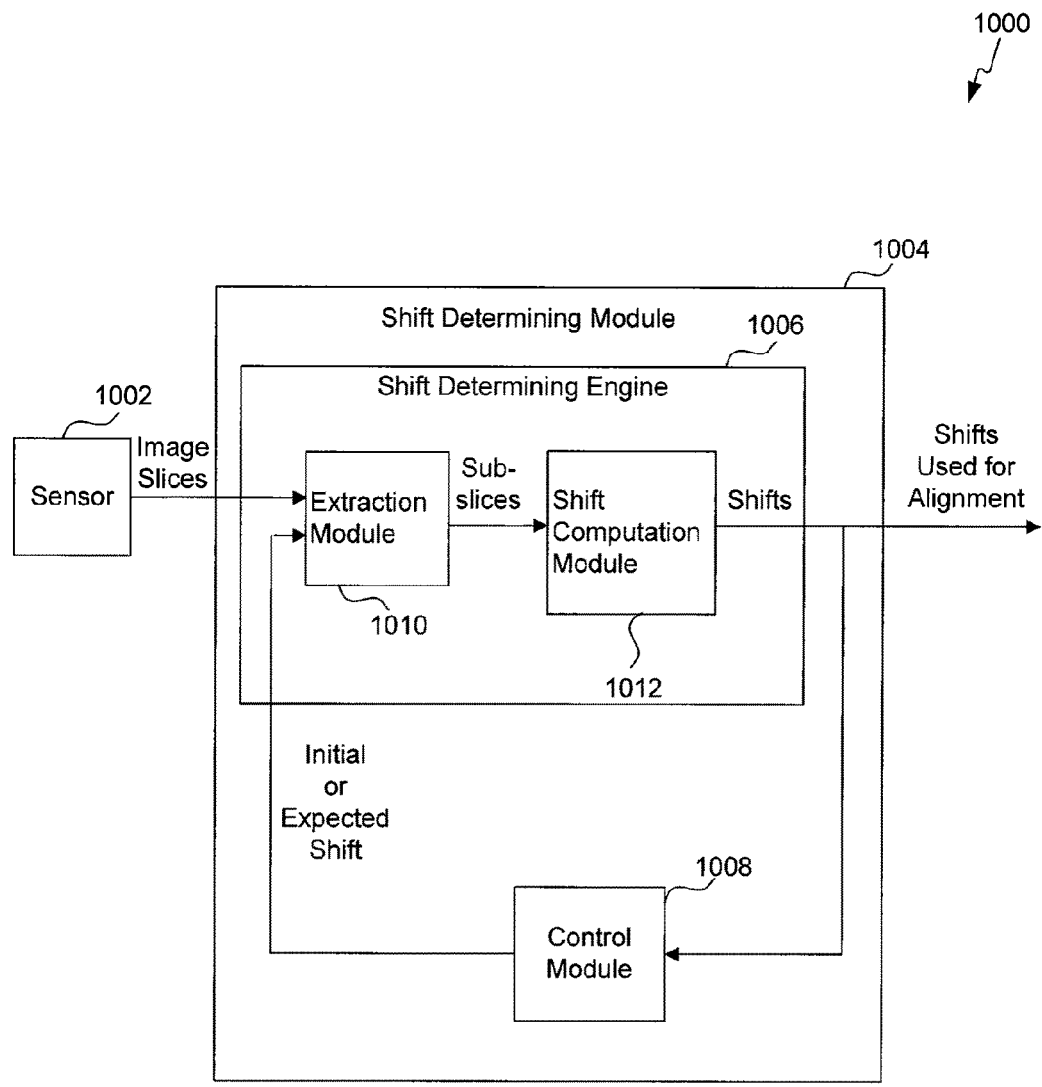
FIG. 10 is an illustration of a system for analyzing image slices, according to an embodiment of the present invention.

FIG. 10 shows a system for processing image slices 1000, according to an embodiment of the present invention. System 100 includes a sensor 1002 and a shift determining module 1004. Sensor 1002 may be substantially similar to sensor 702 described above. Shift determining module 1004 includes a shift determining engine 1006 and a control module 1008. Shift determining engine 1006 includes an extraction module 1010 and a shift computation module 1012. The operation of system 1000 will be described with reference to FIG. 11 below.

Figure 11:
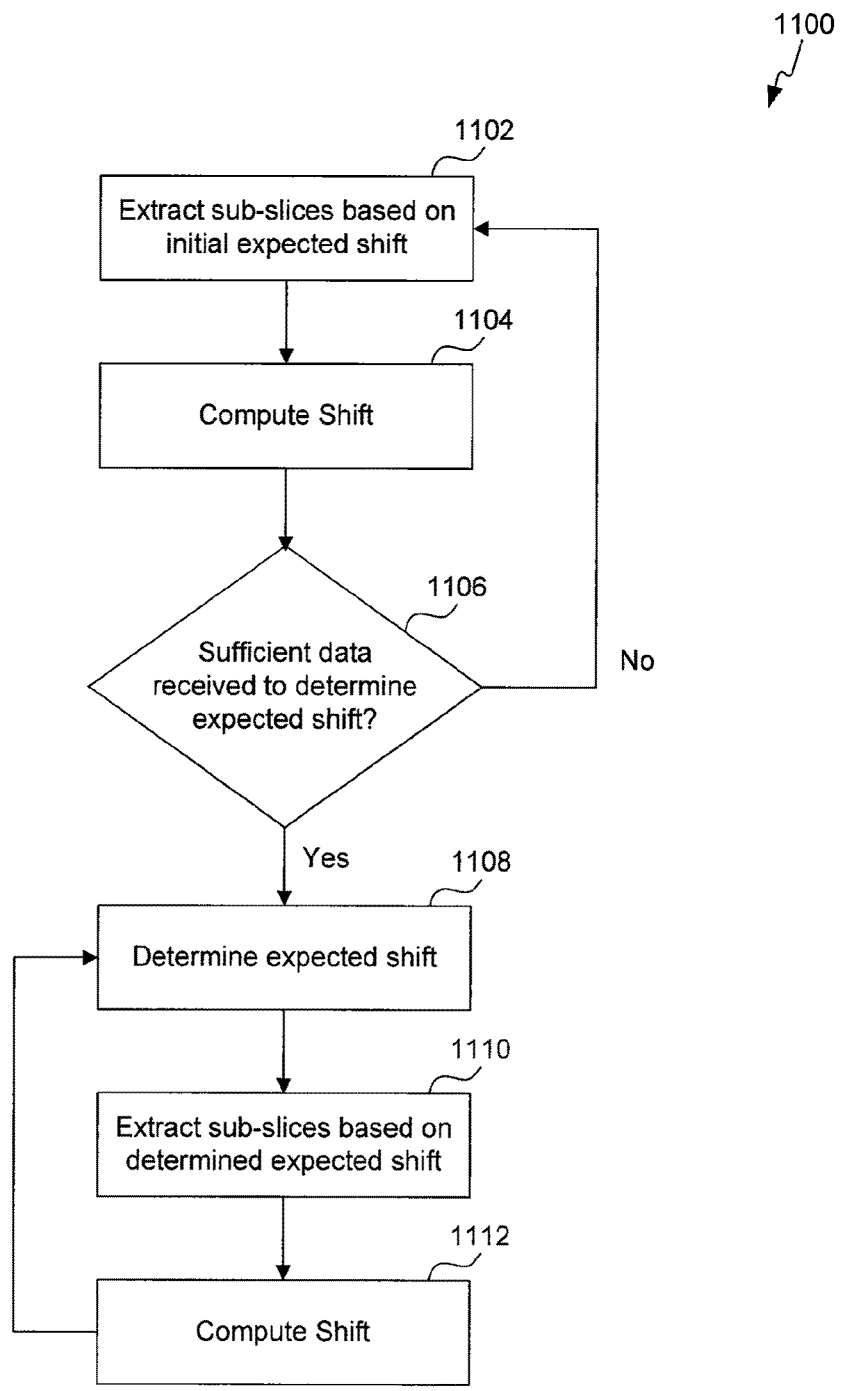
FIG. 11 is a flowchart of a method for analyzing image slices, according to embodiments of the present invention.

FIG. 11 shows a flowchart 1100 of a method for analyzing image slices, according to an embodiment of the present invention. Flowchart 1100 is described with reference to the embodiment of FIG. 10. However flowchart 1100 is not limited to that embodiment. The steps shown in FIG. 11 do not necessarily have to occur in the order shown. The steps of FIG. 11 are described in detail below.

In step 1102, a sub-slice is extracted from each of a first and second image slice. The dimension of the extracted sub-slices may be based on an initial expected shift and/or a range of expected shifts. The initial expected shift may be determined based on prior information (e.g., prior information regarding initial image slices produced in a scan of a fingerprint).

For example, in FIG. 10, extraction module 1010 of shift determining engine 1006 receives first and second image slices from sensor 1002. Extraction module 1010 also receives an initial shift from control module 1008. Based on the initial expected shift in the Y direction received from control module 1008, extraction module 1010 determines the heights of the sub-slices. Alternatively, the initial expected shift may be programmed into extraction module 1010.

For example, extraction module 1010 can determine the heights of the subs-slices as being the initial expected shift in the Y direction subtracted from the heights of the first and second image slices. The length of the sub-slices may be determined based on a range of expected shifts in the X direction received from control module 1008 or programmed in extraction module 1010, as described with respect to sub-slices 306 and 308. The location of the sub-slices with respect to the first and second image slices can be determined in a manner similar to as described with respect to step 902 of flowchart 900.

In step 1104, a shift is computed between the first and the second image slices based on the extracted sub-slices. The shift between the first and second image slices may be computed by computing a PHAse Transform of or a correlation between the extracted sub-slices, as described above.

For example, in FIG. 10, shift computation module 1012 computes a shift between the first and second image slices based on the extracted sub-slices slices. Shift computation module 1010 may compute shifts by computing a PHAse Transform of the extracted sub-slices.

In step 1106, it is determined whether sufficient data has been received so that an expected shift can be determined. In an embodiment, an expected shift may be determined on past shift information. For example, in FIG. 10, control module 1008 may require 3 past shifts before an expected shift can be determined. Thus, if control module 1008 has not received at least 3 shifts, an expected shift cannot be determined by control module 1008.

If sufficient data has not been received to determine an expected shift, flowchart 1100 returns to step 1102. In an embodiment, steps 1102 through 1106 are repeated until sufficient data is received to determine an expected shift. Once sufficient data has been received to determine an expected shift, flowchart 1100 proceeds to step 1108. In step 1108, an expected shift is determined. For example, the expected shift may be determined as a mean or median of a past set of values. For example, in FIG. 10, control module 1008 may compute a median of the last 3 shifts outputted by shift computation module 1012 to determine an expected shift. In alternate embodiments, control module 1008 may use other statistical operators to compute an expected shift. For example, control module 1008 may compute an average of the last 3 shifts outputted by shift computation module 1012 to compute the expected shift. Expected shifts in the X and/or Y directions may thus be determined based on past shift information.

In step 1110, a sub-slice is extracted from each of a third and fourth image slices. In an embodiment, step 1110 is substantially similar to step 1102 described above. However in step 1110, one or more dimensions of the sub-slices are determined based on the expected shift rather than an initial expected shift. For example, in FIG. 10, extraction module 1010 extracts sub-slices from third and fourth image slices based on the expected shift computed buy control module 1008. In particular, the height of the sub-slices extracted from the third and fourth image slices may be determined based on the expected shift in a manner similar to as described with reference sub-slices 306 and 308, above. The length and locations of the sub-slices with respect to the first and second image slices can be similar to as described with reference to step 1102, above.

In step 1112 a shift is computed between the third and fourth image slices based on the extracted sub-slices. In an embodiment, step 1112 is substantially similar to step 1104, however the sub-slices used in step 1112 have one or more dimensions determined by an expected shift rather than an initial expected shift.

As shown in FIG. 11, flowchart 1100 returns to step 1108 after step 1112. Thus, once sufficient data is received to determined an expected shift, one or more dimensions of the extracted sub-slices is determined based on the determined expected shift rather than the initial expected shift.

FIGS. 7 and 10 show systems 700 and 1000 for processing image slices according to an embodiment of the present invention. In system 700, multiple shift determining engines are run in parallel and a shift is selected from the shift determining engines to be used to align image slices. System 700 can have one or more shift determining engines turned off or otherwise disabled if it is determined that one of the shift determining engines can provide accurate shift information.

System 1000 utilizes a feedback loop that allows the dimensions of the sub-slices to be adjusted in real time based on previous shift information. Since system 1000 only has a single shift determining engine running at a single time, system 1000 may be more efficient with respect to power use and speed than system 700. Furthermore, in the embodiment in which shift determining engines are implemented as hardware, the embodiment of system 1000 may require less space to implement than the embodiment of system 700. As described above, statistical operators used to determine an expected shift compute the expected shift based on past shift information. The number of shifts considered in determining the expected shift may be changed based on memory availability in a system. For example, if a system has a large amount of available memory, a determination of the expected shift may include more shift values.

Navigation Using Shift Information

In the embodiments described above, shift information is determined. This shift information can be used to align image slices to form a coherent fingerprint image. In alternate embodiments, shift information can also be used in navigation systems to determine the displacement of an object. For example, the movement of a finger on a fingerprint scanner may be used to determine the displacement of a cursor on a computer screen. As would be appreciated by those skilled in the relevant art(s), laptops or other types of computing devices often have navigation pads on which a user moves his/her finger. The movement of the finger is reflected on the screen of the laptop as an appropriate movement of a cursor. In embodiments described herein, these pads can be replaced with a fingerprint scanner that outputs image slices of a fingerprint. Based on shift information computed between slices, a cursor can be moved in an appropriate manner.

Figure 12:
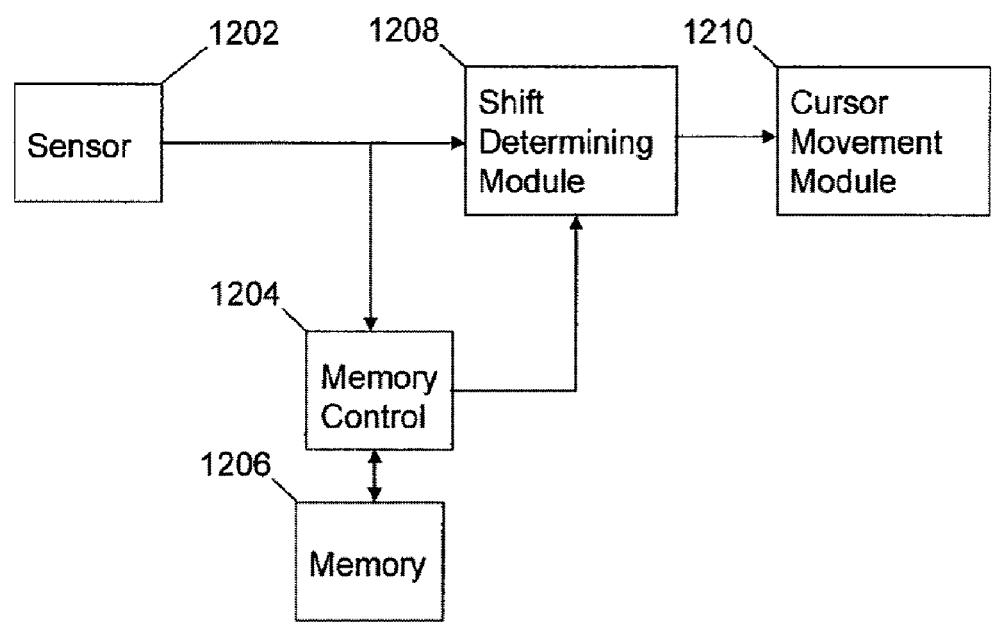
FIG. 12 is an illustration of a system for controlling a cursor on a screen, according to an embodiment of the present invention.

FIG. 12 shows a system for controlling a cursor on a screen 1200, according to an embodiment of the present invention. System 1200 includes a sensor 1202, a memory controller 1204, a memory 1206, a shift determining module 1208, and a cursor movement module 1210. Sensor 1202 may be substantially similar to sensor 702 described above. In an embodiment, shift determining module 1206 may be substantially similar to shift determining module 704 or shift determining module 1004 described with reference to FIGS. 7 and 10, respectively. The elements of system 1200 can be implemented as hardware, software, firmware, or any combination thereof. The operation of system 1200 will be described with reference to FIG. 13, below.

Figure 13:
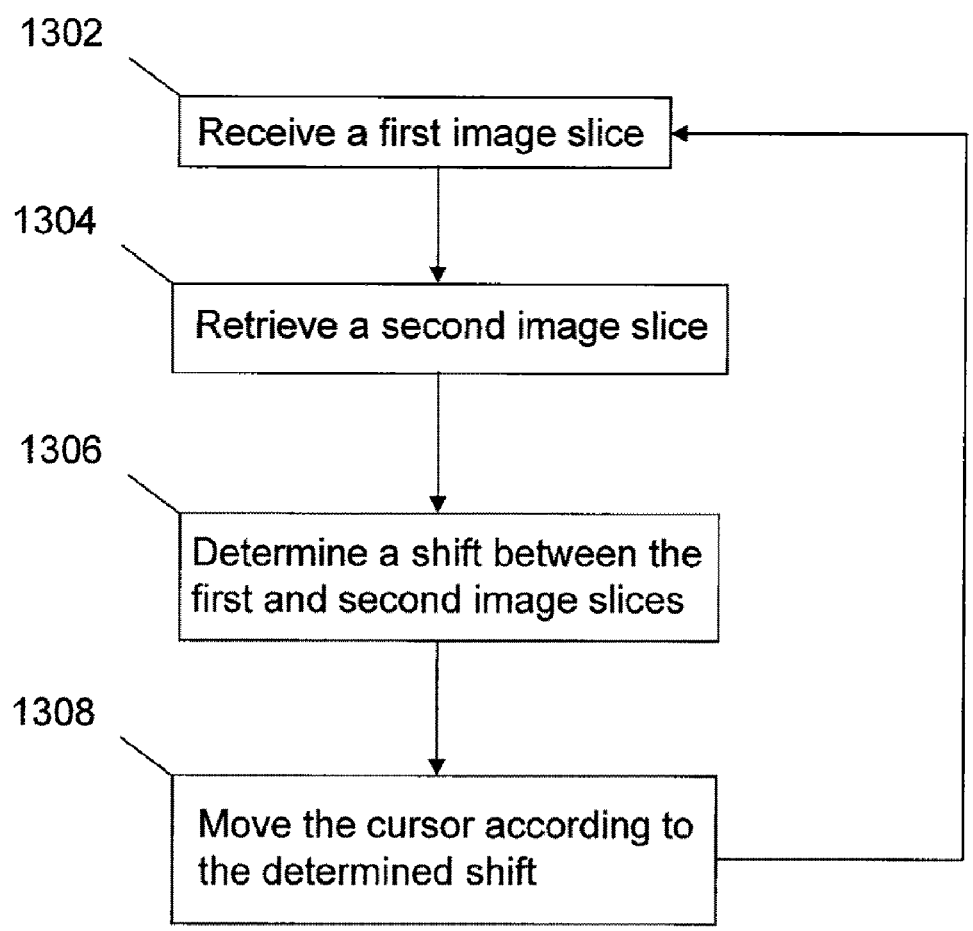
FIG. 13 is flowchart of a method for controlling a cursor on a screen, according to embodiments of the present invention.

FIG. 13 shows a flowchart 1300 of a method for controlling a cursor on a screen, according to an embodiment of the present invention. Flowchart 1300 is described with reference to the embodiment of FIG. 12. However flowchart 1300 is not limited to that embodiment. The steps shown in FIG. 13 do not necessarily have to occur in the order shown. The steps of FIG. 13 are described in detail below.

In step 1302, a first image slice is received. The first image slice may be an image slice of a scanned fingerprint. For example, in FIG. 12, sensor 1202 outputs a first image slice of a scanned fingerprint that is received by shift determining module 1208.

In step 1304, a second image slice is retrieved. For example, in FIG. 12, memory control 1204 retrieves the second image slice from memory 1206. In an embodiment, upon receiving the first image slice from sensor 1202, shift determining module 1208 can request that the second image slice be retrieved from memory 1206. Upon retrieving the second image slice, control module 1204 can send the second image slice to shift determining module 1208.

In step 1306, a shift between the first and second image slices is determined. In an embodiment, determining the shift between the first and second image slices can include extracting sub-slices from each of the first and second image slices. In a further embodiment, determining the shift between the first and second image slices can include one or more steps of flowcharts 900 and/or 1100, as described above. Alternatively, the shift may be determined using the first and second image slices themselves. For example, the shift between the first and second image slices may be computed by computing a PHAse Transform of the first and second image slices.

For example, in FIG. 12, shift determining module 1208 can determine shifts in the X and Y direction between the first and second image slices. In an embodiment, shift determining module 1208 is implemented as shift determining module 704, described with reference to FIG. 7 or as shift determining module 1004, described with reference to FIG. 10.

Figure 14:
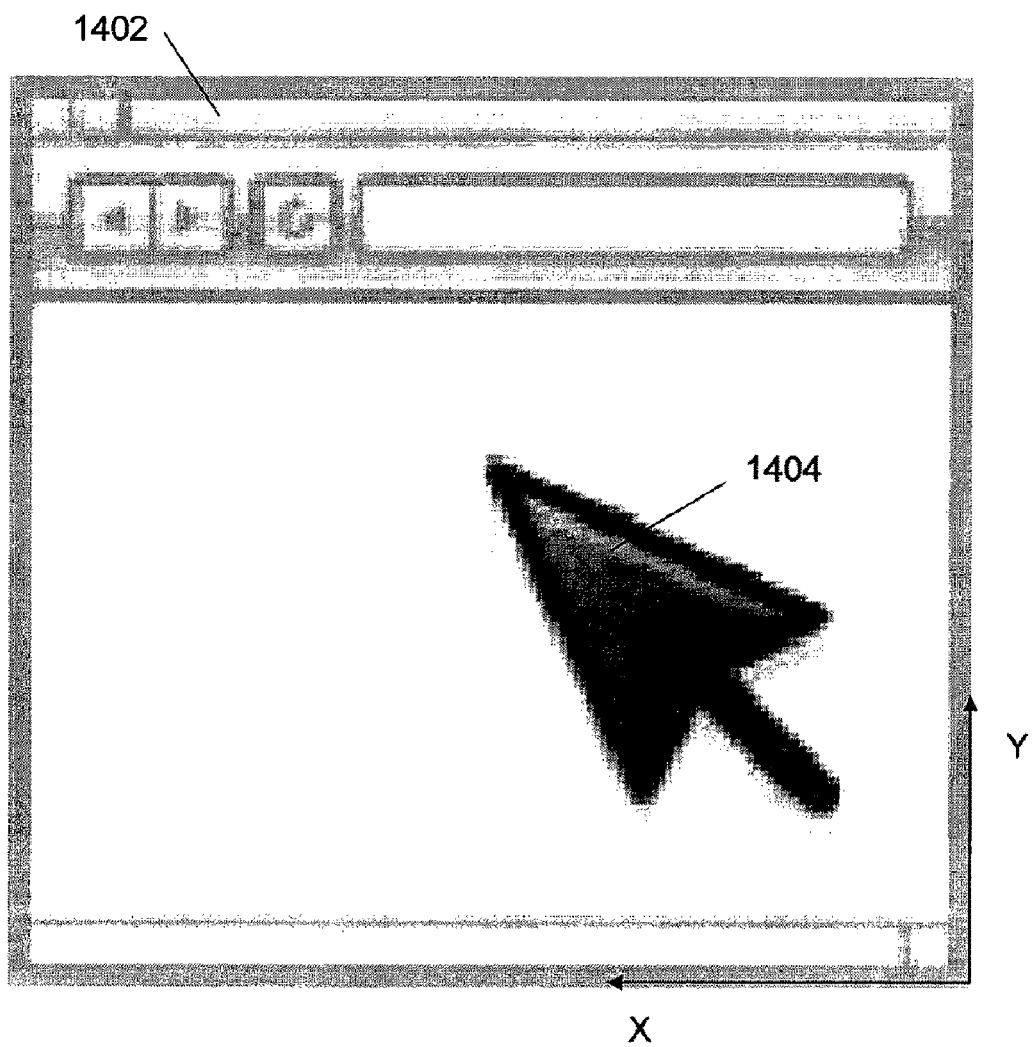
FIG. 14 is an illustration of a screen, according to an embodiment of the present invention.

In step 1308 a displacement of a cursor is determined based on the determined shift. For example, in FIG. 12, cursor movement module 1210 can determine a displacement of the cursor to be a first number of pixels in the X direction and a second number of pixels in the Y direction. In an embodiment, cursor movement module 1210 maps the shift in each direction to a corresponding number of pixels the cursor is to be displaced. Thus, the shift in the X direction may be mapped to a number of pixels the cursor is to be displaced in the X direction and the shift in the Y direction can be mapped to a number of pixels to be displaced in the Y direction. For example, for determined shifts in the X and Y direction of 2 and 5 pixels, respectively, can be mapped to a displacement of a cursor on a screen of 4 and 10 pixels in the X and Y directions, respectively. FIG. 14 shows a screen 1402 that includes cursor 1404. In an embodiment, cursor movement module 1210 displaces cursor 1404 by the first number of pixels and the second number of pixels in the X and Y directions, respectively.

The steps of flowchart 1300 may be repeated. For example, the steps of flowchart 1300 can be repeated every 1 ms or 10 ms. As the rate at which the steps of flowchart 1300 is repeated increased, the response time between a movement of a finger on a fingerprint sensor and the displacement of a cursor on a screen can be improved. In a further embodiment, the rate at which the steps of flowchart 1300 is repeated set so that a user perceives a nearly instantaneous response to his/her finger movements on a fingerprint scanner or sensor.

In the navigation embodiments described above, a navigation pad of a laptop can be replaced by a fingerprint sensor. Using the shift information determined based on the outputs of the fingerprint sensor, the displacement of a cursor can be controlled. Such a system may reduce the cost of the laptop by removing the requirement of a navigation pad and instead using a fingerprint sensor that may already be included for other applications (e.g., as a part of an authorization system used to grant access to the laptop only to selected individuals). Furthermore, space and power may also be saved by removing the navigation pad. In a further embodiment, the precision of the shift determining process can be such that less physical movement of a finger may be needed to move a cursor on a screen.

The embodiments above describe determining a shift between image slices scanned by a fingerprint sensor. As would be appreciated by those skilled in the relevant art(s), the shift determining systems and techniques described above can also be applied to complete fingerprint images. For example, a shift can be determined between a first fingerprint image taken at a first time and a second fingerprint image taken at a second time.

The present invention (i.e., elements of FIGS. 7, 8, 10, and 12 and flowcharts 900, 1100, 1300 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 15:
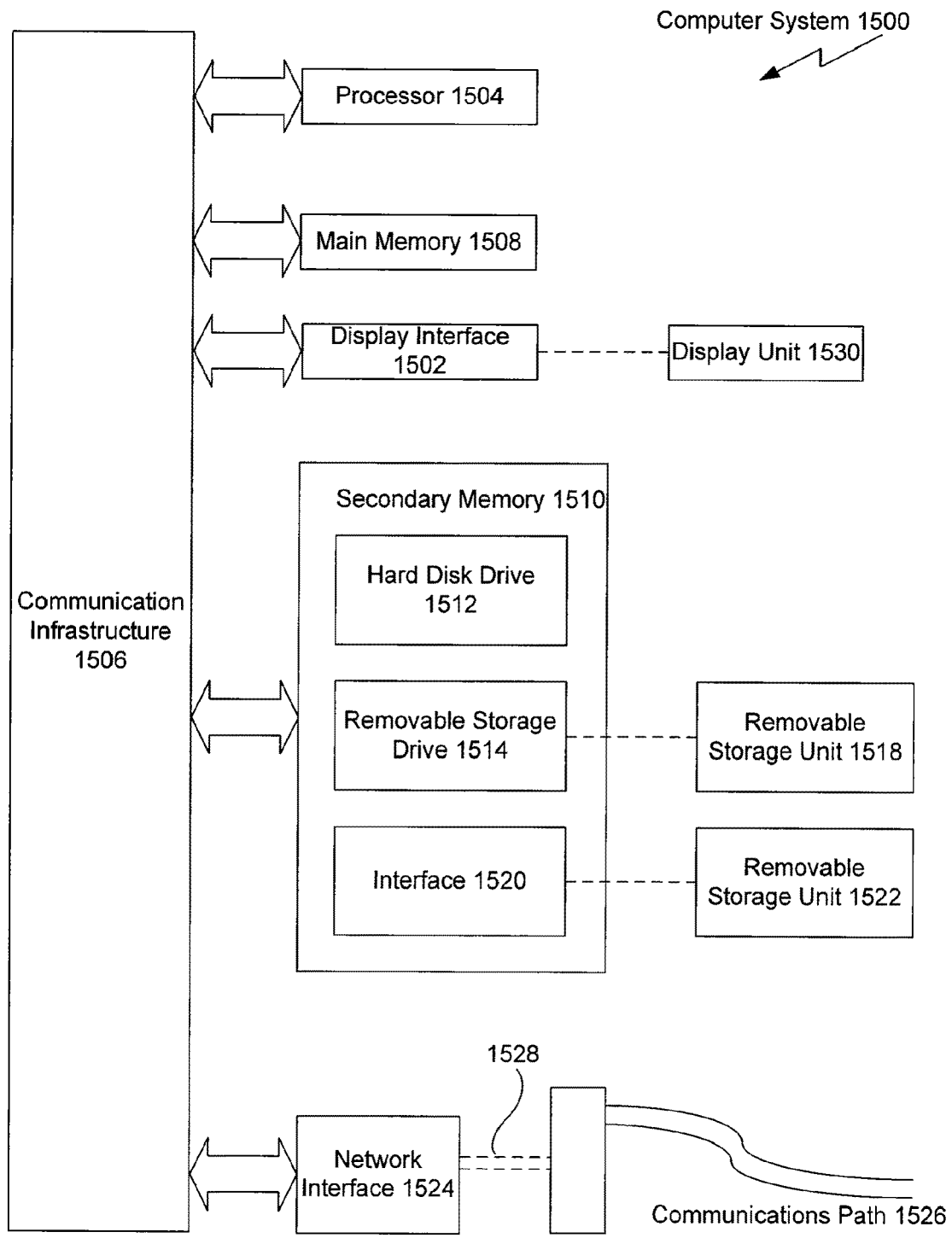
FIG. 15 is a block diagram illustration of an exemplary computer system on which the present invention can be implemented.

In fact, in one embodiment, the invention is directed toward one or more computer systems capable of carrying out the functionality described herein. An example of a computer system 1500 is shown in FIG. 15.

The computer system 1500 includes one or more processors, such as processor 1504. The processor 1504 is connected to a communication infrastructure 1506 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 1500 can include a display interface 1502 that forwards graphics, text, and other data from the communication infrastructure 1506 (or from a frame buffer not shown) for display on the display unit 1530.

Computer system 1500 also includes a main memory 1508, preferably random access memory (RAM), and may also include a secondary memory 1510. The secondary memory 1510 may include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well known manner. Removable storage unit 1518 represents a floppy disk, magnetic tape, optical disk, etc. which is read by and written to by removable storage drive 1514. As will be appreciated, the removable storage unit 1518 includes a computer usable storage medium having stored therein computer software and/or data.

In alternative embodiments, secondary memory 1510 may include other similar devices for allowing computer programs or other instructions to be loaded into computer system 1500. Such devices may include, for example, a removable storage unit 1522 and an interface 1520. Examples of such may include a program cartridge and cartridge interface (such as that found in video game devices), a removable memory chip (such as an erasable programmable read only memory (EPROM), or programmable read only memory (PROM)) and associated socket, and other removable storage units 1522 and interfaces 1520, which allow software and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a Personal Computer Memory Card International Association (PCM-CIA) slot and card, etc. Software and data transferred via communications interface 1524 are in the form of signals 1528 which may be electronic, electromagnetic, optical or other signals capable of being received by communications interface 1524. These signals 1528 are provided to communications interface 1524 via a communications path (e.g., channel) 1526. This channel 1526 carries signals 1528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1514 and a hard disk installed in hard disk drive 1512. These computer program products provide software to computer system 1500. The invention is directed to such computer program products.

Computer programs (also referred to as computer control logic) are stored in main memory 1508 and/or secondary memory 1510. Computer programs may also be received via communications interface 1524. Such computer programs, when executed, enable the computer system 1500 to perform the features of the present invention, as discussed herein. In particular, the computer programs, when executed, enable the processor 1504 to perform the features of the present invention. Accordingly, such computer programs represent controllers of the computer system 1500.

In an embodiment where the invention is implemented using software, the software may be stored in a computer program product and loaded into computer system 1500 using removable storage drive 1514, hard drive 1512 or communications interface 1524. The control logic (software), when executed by the processor 1504, causes the processor 1504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for controlling a cursor on a screen, comprising:
    determining at least one dimension for a first sub-slice and for a second sub-slice;
    extracting, using a computer processor, the first and second sub-slices from first and second image slices, respectively, wherein each of the first and second image slices capture an image of a portion of a finger and wherein the first and second image slices overlap in a first overlapping region and the first and second sub-slices overlap in a second overlapping region;
    computing a shift between the first image slice and the second image slice based information included in the second overlapping region while ignoring at least a portion of information included in the first overlapping region that is outside of the second overlapping region; and
    determining a displacement of the cursor on the screen based on the computed shift.

2. The method of claim 1, wherein the computing step comprises:
    computing a PHAse Transform of the first and second sub-slices.

3. The method of claim 1, wherein the computing step comprises:
    computing a correlation between the first and second sub-slices.

4. The method of claim 1, further comprising:
    repeating the extracting, the computing, and the determining steps.

5. The method of claim 1, further comprising:
    receiving the first image slice from a scanner; and
    retrieving the second image slice from a memory.

6. The method of claim 5, further comprising:
    storing the first image slice in the memory.

7. The method of claim 6, wherein the storing step comprises:
    overwriting the second image slice with the first image slice in the memory.

8. A system for controlling a cursor on a screen, comprising:
    a memory; and
    a processor coupled to the memory and configured to execute a plurality of modules, wherein the modules include:
    a shift determining module configured to determine a shift between a first image slice and a second image slice, wherein each of the first and second image slices capture an image of a portion of a finger, the shift determining module comprising:
        a control module configured to determine at least one dimension for a first sub-slice and for a second sub-slice:
        an extraction module configured to extract the first and second sub-slices from the first and second image slices, respectively, wherein the first and second image slices overlap in a first overlapping region and the first and second sub-slices overlap in a second overlapping region; and
        a shift computation module configured to compute the shift between the first and second image slices based on information included in the second overlapping region while ignoring at least a portion of information included in the first overlapping region that is outside of the second overlapping region; and
    a cursor movement module configured to determine a displacement of the cursor on the screen based on the determined shift.

9. The system of claim 8, wherein the shift computation module is configured to compute a PHAse Transform of the first and second sub-slices.

10. The system of claim 8, wherein the shift computation module is configured to compute a correlation between the first and second sub-slices.

11. The system of claim 8, further comprising:
    a sensor configured to output image slices;
    wherein the shift determining module is configured to receive the first image slice from the sensor and the second image slice from the memory.

12. The system of claim 11, wherein:
    the control module is configured to overwrite the second image slice with the first image slice.

* * * * *